United States Patent [19]
Toda et al.

[11] Patent Number: 6,120,112
[45] Date of Patent: Sep. 19, 2000

[54] BRAKE PRESSURE CONTROL DEVICE FOR VEHICLE

[75] Inventors: Hiroshi Toda, Kariya; Akihito Kusano, Toyota; Hiroaki Aizawa, Kariya, all of Japan

[73] Assignee: Aisin Seiki Kabushiki Kaisha, Kariya, Japan

[21] Appl. No.: 09/124,417

[22] Filed: Jul. 29, 1998

[30] Foreign Application Priority Data

Jul. 29, 1997 [JP] Japan .................................. 9-203271

[51] Int. Cl.⁷ ........................................................ B60T 8/40
[52] U.S. Cl. ............................. 303/116.1; 303/113.4; 303/166
[58] Field of Search .................... 303/113.4, DIG. 3, 303/DIG. 4, 166, 116, 116.1, 116.2, 155, 11

[56] References Cited

U.S. PATENT DOCUMENTS

| | | | |
|---|---|---|---|
| 4,778,223 | 10/1988 | Inoue ...................................... | 303/166 |
| 4,989,925 | 2/1991 | Kohno . | |
| 5,624,164 | 4/1997 | Tozu et al. .............................. | 303/9.62 |
| 5,658,057 | 8/1997 | Ohnuma et al. ...................... | 303/119.2 |
| 5,921,638 | 7/1999 | Higashimura et al. ............... | 303/116.1 |

FOREIGN PATENT DOCUMENTS

| | | |
|---|---|---|
| 1 961 039 | 6/1974 | Germany . |
| 63-64858 | 3/1988 | Japan . |
| 2-49943 | 10/1990 | Japan . |
| 6-321191 | 11/1994 | Japan . |

*Primary Examiner*—Robert J. Oberleitner
*Assistant Examiner*—Devon Kramer
*Attorney, Agent, or Firm*—Burns, Doane, Swecker & Mathis, LLP

[57] ABSTRACT

A brake pressure control device for a vehicle includes a wheel brake, a reservoir, a master cylinder, an accumulator which stores the fluid pressure at a pressure higher than the fluid pressure generated by the master cylinder, and a fluid pump which discharges fluid pressure higher than the fluid pressure in the accumulator. A first fluid conduit connects the master cylinder to the wheel brake, a second fluid conduit connects the fluid pump to the wheel brake, a third fluid conduit connects the fluid pump to the accumulator, a fourth fluid conduit connects the accumulator to the suction port of the fluid pump, and a fifth fluid conduit connects the wheel brake to the reservoir. A first valve opens and closes the first fluid conduit, a second valve opens and closes the second fluid conduit, a third valve opens and closes the third fluid conduit, a fourth valve opens and closes the fourth fluid conduit, and a fifth valve opens and closes the fifth fluid conduit. A foot force sensor detects the force applied to the brake pedal, a vehicle deceleration sensor senses the vehicle deceleration, and a controller estimates a target deceleration of the vehicle based on the foot force detected by the foot force sensor. The controller supplies fluid pressure to the wheel brake by controlling the first valve, the second valve, the fourth valve, the fifth valve and the fluid pump so that the vehicle deceleration agrees with the target deceleration of the vehicle estimated by the controller and controls the third valve and the fluid pump in order to store the fluid pressure in the accumulator.

18 Claims, 8 Drawing Sheets

BRAKE PRESSURE CONTROL DEVICE FOR VEHICLE

The present application is based on and claims priority under 35 U.S.C. §119 with respect to Japanese Application No. 09 (1997)-2032271, the entire content of which is incorporated herein by reference.

FIELD OF THE INVENTION

The present invention generally relates to a vehicle braking system. More particularly, the present invention pertains to a brake pressure control device for a vehicle that includes a plurality of pressure sources.

BACKGROUND OF THE INVENTION

One type of conventional vehicle brake pressure control device includes a static pressure dual brake circuit. One of the brake circuits is formed with a first wheel brake that applies a brake force proportional to a fluid pressure to a first wheel, a second wheel brake that applies a brake force proportional to a fluid pressure to a second wheel, a reservoir which stores brake fluid under atmospheric pressure, and a master cylinder. The master cylinder is connected to the reservoir containing brake fluid, generates fluid pressure in proportion to the brake pedal operation force, and applies the fluid pressure to the wheel brakes.

This conventional vehicle brake pressure control device further includes a first normally-open type electromagnetic valve disposed on a first fluid conduit connecting the master cylinder to the first wheel brake, a second normally-open type electromagnetic valve disposed on a second fluid conduit connecting the master cylinder to the second wheel brake, a first normally-closed type electromagnetic valve disposed on a third fluid conduit connecting the first wheel brake to the reservoir, a second normally-closed type electromagnetic valve disposed on a fourth fluid conduit connecting the second wheel brake to the reservoir, and a fluid pump which returns brake fluid to portions of the first and second fluid conduits connecting the master cylinder and each of the first and second normally-open type electromagnetic valves.

In this conventional vehicle brake pressure control device, at a point approximately when the first wheel would tend to lock (the "lock tendency point") because of the brake force generated by the brake operation of a vehicle driver, the first normally-open type electromagnetic valve is closed to interrupt the supply of brake fluid to the first wheel brake from the master cylinder, and the first normally-closed type electromagnetic valve is opened to discharge pressurized brake fluid in the first wheel brake to the reservoir. When the rotational speed of the first wheel is restored past the lock tendency point by virtue of the decrease of the fluid pressure in the first wheel brake, the first normally-open type electromagnetic valve is opened and the first normally-closed type electromagnetic valve is closed again, thus once again applying fluid pressure generated by the master cylinder to the first wheel brake.

The fluid pump used in the above-described brake pressure control device is typically a piston pump which cannot draw in brake fluid under atmospheric pressure. The piston pump includes a mechanism for attenuating the pulsation of the pump discharge to prevent the driver from feeling uncomfortable with the brake pedal operation because of the transmission of the pulsation of the pump discharge to the brake pedal.

Another conventional vehicle brake pressure control device includes first and second wheel brakes which are disposed on first and second wheels respectively, with either or both of the wheels being driving wheels, a third normally-open type electromagnetic valve disposed on a fluid conduit connecting the master cylinder and the first and second normally-open type electromagnetic valves, a fluid pump which is able to draw in brake fluid under atmospheric pressure, and a third normally-closed type electromagnetic valve disposed on a conduit connecting a suction port of the fluid pump to a reservoir. This conventional brake system also includes first and second normally closed electromagnetic valves similar to those described above in connection with the first described conventional brake pressure control device.

According to this second type of conventional vehicle brake pressure control device, when the first wheel tends to be spun because of the drive force supplied to the first wheel, the second normally-open type electromagnetic valve, the third normally-open type electromagnetic valve and the third normally-closed type electromagnetic valve are operated and the fluid pump is driven to supply pressurized brake fluid from the reservoir to the first wheel brake. When the spinning of the first wheel is stopped by virtue of the supply of pressurized brake fluid to the first wheel brake, the first normally-open type electromagnetic valve is operated to interrupt the flow of pressured brake fluid into the first wheel brake from the fluid pump and the first normally-closed type electromagnetic valve is operated to relieve the fluid pressure in the first wheel brake to the reservoir, thereby decreasing the fluid pressure in the first wheel brake.

This second type of conventional vehicle brake pressure control device further includes a relief valve which regulates the maximum value of the discharge fluid pressure of the fluid pump, thereby relieving pressure when the fluid pressure exceeds a certain predetermined value.

A further conventional vehicle brake pressure control device includes a pre-charging pump disposed on a fluid conduit connecting the suction port of the fluid pump to the reservoir to rapidly increase the fluid pressure in the first wheel brake at the early stage of the fluid pump operation. Alternatively, instead of a pre-charging pump, another vehicle brake pressure control device includes an accumulator for storing high fluid pressure and an electromagnetic valve which controls the flow of fluid into and out of the accumulator. This conventional type of device involving the use of an accumulator is further provided with a surveillance apparatus for observing the fluid pressure in the accumulator. The surveillance apparatus drives the fluid pump when the fluid pressure in the accumulator is less than a predetermined minimum value, and stops the driving operation of the fluid pump when the fluid pressure in the accumulator exceeds a predetermined maximum value.

The above-described conventional vehicle brake pressure control devices suffer from the disadvantage that they tend to be rather complicated in construction, thus resulting in a brake circuit that is undesirably high in cost.

SUMMARY OF THE PRESENT INVENTION

The present invention provides a vehicle brake pressure control device that is not as complicated as other known devices and is relatively less costly. In accordance with the present invention, a brake pressure control device for a vehicle includes a wheel brake, a reservoir, a master cylinder, an accumulator which stores the fluid pressure at a pressure higher than the fluid pressure generated by the master cylinder, and a fluid pump which discharges fluid pressure higher than the fluid pressure in the accumulator. A first fluid conduit connects the master cylinder to the wheel brake, a second fluid conduit connects the fluid pump to the wheel brake, a third fluid conduit connects the fluid pump to the accumulator, a fourth fluid conduit connects the accumulator to the suction port of the fluid pump, and a fifth fluid conduit connects the wheel brake to the reservoir. A first valve opens and closes the first fluid conduit, a second valve opens and closes the second fluid conduit, a third valve opens and closes the third fluid conduit, a fourth valve opens and closes the fourth fluid conduit, and a fifth valve opens and closes the fifth fluid conduit. A foot force sensor detects the force applied to the brake pedal, a vehicle deceleration sensor senses the vehicle deceleration, and a controller estimates a target deceleration of the vehicle based on the foot force detected by the foot force sensor. The controller supplies fluid pressure to the wheel brake by controlling the first valve, the second valve, the fourth valve, the fifth valve and the fluid pump so that the vehicle deceleration agrees with the target deceleration of the vehicle estimated by the controller and controls the third valve and the fluid pump in order to store the fluid pressure in the accumulator.

According to another aspect of the invention, a vehicle brake pressure control device includes a wheel brake for applying a brake force to a vehicle wheel, a master cylinder connected to the wheel brake and adapted to generate fluid pressure proportional to a brake pedal operation force, and an accumulator connected to the suction port of the fluid pump and adapted to store fluid pressure which is higher than the fluid pressure generated by the master cylinder, and a fluid pump connected to the wheel brake and adapted to discharge fluid pressure to the wheel brake which is higher than the fluid pressure in the accumulator. A first valve is disposed between the master cylinder and the wheel brake for controlling fluid pressure supplied from the master cylinder to the wheel cylinder, a second valve disposed between the fluid pump and the wheel brake for controlling fluid pressure supplied from the fluid pump to the wheel cylinder, a third valve disposed between the accumulator and the pump for controlling fluid pressure supplied by the accumulator to the wheel brake, a brake pedal operation force detecting means for detecting a brake pedal operation force, a deceleration detecting mechanism for detecting vehicle deceleration, and a controller which estimates a target deceleration of the vehicle based on the brake pedal operation force detected by the brake pedal operation force detecting mechanism. The controller controls the first, second and third valves to supply fluid pressure to the wheel brake so that the vehicle deceleration detected by the deceleration detecting mechanism coincides with the target deceleration of the vehicle estimated by the controller.

According to a further aspect of the invention, a vehicle brake pressure control device includes a wheel brake for applying a brake force to a vehicle wheel, a master cylinder connected to the wheel brake and adapted to generate fluid pressure proportional to a brake pedal operation force, an accumulator adapted to store fluid pressure which is higher than the fluid pressure generated by the master cylinder, and a fluid pump connected to the wheel brake and adapted to discharge fluid pressure to the wheel brake which is higher than the fluid pressure in the accumulator. The accumulator is connected to the suction port of the fluid pump so that fluid pressure from the accumulator flows into the fluid pump. A vehicle deceleration detector detects the vehicle deceleration and a device estimates a target deceleration of the vehicle. A controller controls fluid pressure supplied to the wheel cylinder to produce coincidence between the vehicle deceleration detected by the vehicle deceleration detector and the target deceleration of the vehicle by: 1) supplying fluid pressure to the wheel brake from the master cylinder when the target deceleration of the vehicle determined by the controller is less than a first predetermined value; 2) supplying fluid pressure to the wheel brake from the accumulator when the target deceleration of the vehicle determined by the controller is greater than the first predetermined value and less than a second predetermined value; and 3) supplying fluid pressure to the wheel brake from the fluid pump when the target deceleration of the vehicle determined by the controller is greater than the second predetermined value.

BRIEF DESCRIPTION OF THE DRAWING FIGURES

The foregoing and additional features of the vehicle brake pressure control device of the present invention will become more apparent from the following detailed description considered with reference to the accompanying drawing figures in which like elements are designated by like reference numerals and wherein.

DETAILED DESCRIPTION OF THE INVENTION

Figure 1:
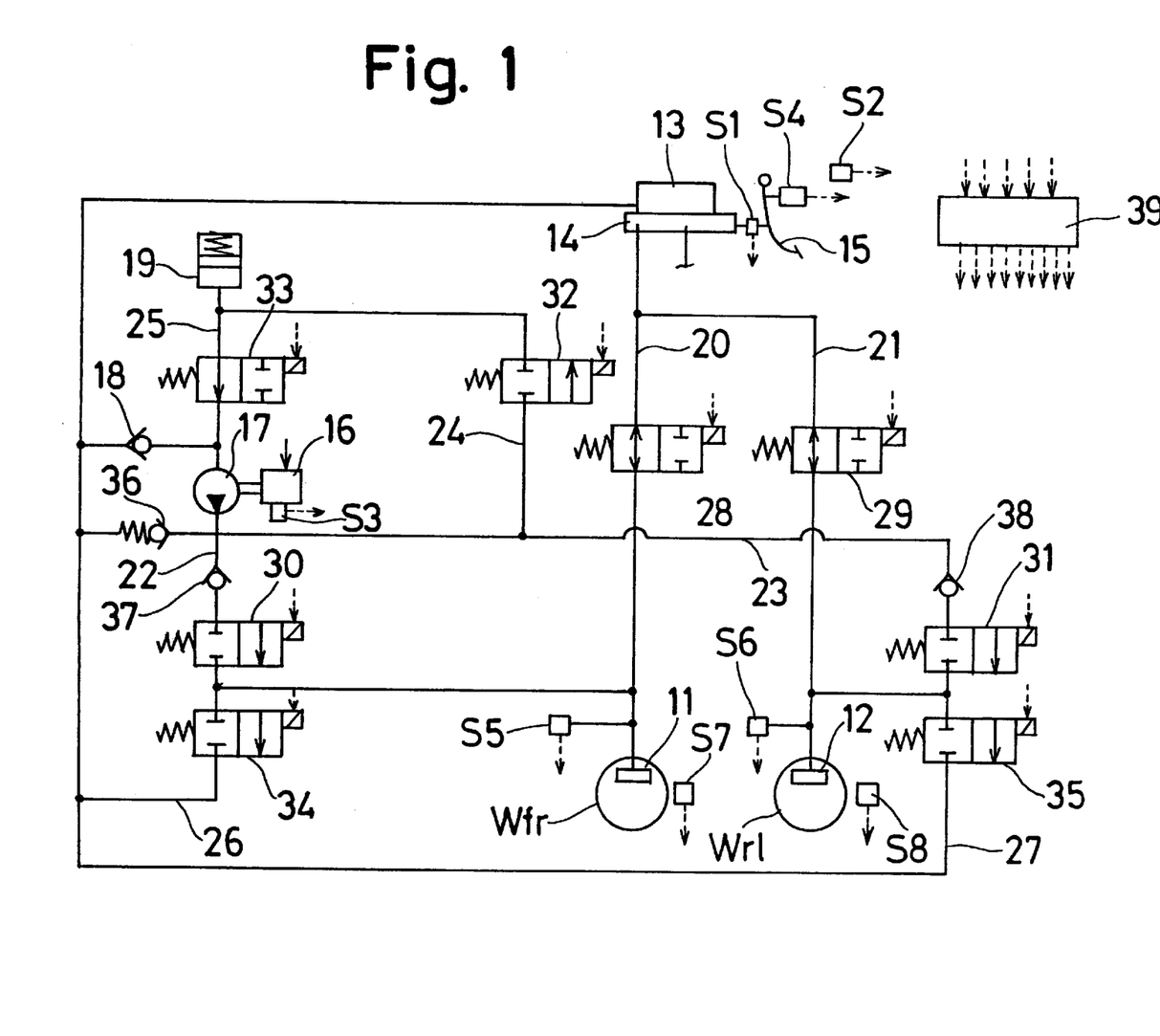
FIG. 1 is a schematic illustration of a first embodiment of the brake pressure control device for a vehicle according to the present invention.

FIG. 1 schematically illustrates the overall system forming one of the brake circuits of the vehicle brake pressure control device according to one embodiment of the present invention. The embodiment depicted in FIG. 1 is used mainly for front-wheel-drive vehicles, entailing what is referred to as a diagonal piping system.

A front-right wheel brake 11 is operatively associated with a driving front-right wheel Wfr to apply a brake force to such wheel that is proportional to the fluid pressure therein that is supplied from a master cylinder 14. A rear-left wheel brake 12 is operatively associated with a non-driving rear-left wheel Wrl to apply a brake force to such wheel in proportion to the fluid pressure therein that is supplied from a master cylinder 14. In addition, a reservoir 13 stores brake fluid under atmospheric pressure.

Using the brake fluid from the reservoir 13, the master cylinder 14 generates fluid pressure in proportion to the brake operation force applied to a brake pedal 15 by the driver and discharges the fluid pressure. A fluid pump 17 which is driven by an electric motor 16 draws in brake fluid in the reservoir 13 through a check valve 18 and discharges fluid pressure. An accumulator 19 stores the fluid pressure discharged from the fluid pump 17. When the fluid pressure at the suction port of the fluid pump 17 is higher than the fluid pressure at the discharge port of the fluid pump 17, the fluid pump 17 permits the fluid pressure at the suction port thereof to flow into the discharge port.

The master cylinder 14 functions as a low fluid pressure source which increases the fluid pressure in the wheel brakes 11, 12 to a first predetermined value P1 when the vehicle brake pressure control device is normally operated. The accumulator 19 functions as a medium fluid pressure source which increases the fluid pressure in the wheel brakes 11, 12 to a second predetermined value P2 (where P2>P1) from the first predetermined value P1 when the vehicle brake pressure control device is normally operated. The fluid pump 17 functions as a high fluid pressure source which increases the fluid pressure in the wheel brakes 11, 12 to a maximum value P3 (where P3>P2) from the second predetermined value P2 when the brake pressure control device for a vehicle is normally operated. The master cylinder 14 increases the fluid pressure in the wheel brakes 11, 12 to a predetermined value (higher than P1) generating a brake force which applies the minimum necessary deceleration to the vehicle when at least one of either the medium fluid pressure source or the high fluid pressure source malfunctions. The minimum necessary deceleration is designated by law.

The fluid pressure generated by the master cylinder 14 is transported to the wheel brake 11 through a fluid conduit 20 and to the wheel brake 12 through a fluid conduit 21. The fluid pressure discharged by the fluid pump 17 is transported to the wheel brake 11 through a fluid conduit 22, to the wheel brake 12 through a fluid conduit 23 and to the accumulator 19 through a fluid conduit 24. The fluid pressure stored in the accumulator 19 is transported to the suction port of the fluid pump 17 through a fluid conduit 25. The fluid pressure flowing out of the wheel brake 11 is transported to the reservoir 13 through a fluid conduit 26 and the fluid pressure flowing out of the wheel brake 12 is transported to the reservoir 13 through a fluid conduit 27.

A normally-open type electromagnetic valve 28 is disposed in the fluid conduit 20, a normally-open type electromagnetic valve 29 is disposed in the fluid conduit 21, a normally-closed type electromagnetic valve 30 is disposed in the fluid conduit 22, a normally-closed type electromagnetic valve 31 is disposed in the fluid conduit 23, a normally-closed type electromagnetic valve 32 is disposed in the fluid conduit 24, a normally-open type electromagnetic valve 33 is disposed in the fluid conduit 25, a normally-closed type electromagnetic valve 34 is disposed in the fluid conduit 26 and a normally-closed type electromagnetic valve 35 is disposed in the fluid conduit 27. The electromagnetic valves 28, 29, 30, 31, 32, 33, 34, 35 are 2-port, 2-position electromagnetic valves. A relief valve 36 regulates the maximum fluid pressure (P3) discharged by the fluid pump 17, by relieving excess pressure (i.e., pressure in excess of P3). In addition, a check valve 37 is disposed in the fluid conduit 22 while a check valve 38 is disposed on the fluid conduit 23.

The other brake circuit forming the brake pressure control device includes a front-left wheel brake and a rear-right wheel brake (not specifically shown in the drawing figures) which apply a brake force to a front-left wheel and a rear-right wheel respectively. This other brake circuit includes the same components as the brake circuit described above and the electric motor 16 drives the fluid pumps included in both brake circuits.

The brake pedal operation force F applied to the brake pedal 15 by the driver is in proportion to the vehicle deceleration G requested by the driver by virtue of the operation of the brake pedal. The amount of fluid pressure P which should be applied to the wheel brakes 11, 12 depends on the required vehicle deceleration G. Therefore, the fluid pressures P which should be applied to the wheel brakes 11, 12 may be determined by the brake pedal operation force F.

With regard to this preferred embodiment of the present invention, the vehicle deceleration values G1, G2, G3 correspond to the brake pedal operation force values F1, F2, F3, respectively. Further, the fluid pressures P1, P2, P3 applied to the wheel brakes 11, 12 correspond to the brake pedal operation force F1, F2, F3, respectively.

When the brake pedal operation force F is increased from 0 to F1 by the action of the vehicle driver applying a force to the brake pedal 15, the electromagnetic valves 28, 29, 30, 31, 32, 33, 34, 35 are not operated and are thus positioned in the manner shown in FIG. 1. Fluid pressure generated by the master cylinder 14 is thus supplied to the wheel brakes 11, 12. In this mode, the fluid pressures P in the wheel brakes 11, 12 can be increased to P1.

When the brake pedal operation force F is increased in the range from F1 to F2, the electromagnetic valves 28, 29, 30, 31 are operated (i.e., the normally-open types electromagnetic valves 28, 29 are closed and the normally-closed type electromagnetic valves 30, 31 are opened) to thereby supply fluid pressure stored in the accumulator 19 to the wheel brake 11 through the electromagnetic valve 33, the fluid pump 17, the check valve 37 and the electromagnetic valve 30, and to the wheel brake 12 through the electromagnetic valve 33, the fluid pump 17, the check valve 38 and the electromagnetic valve 31. In this mode, the fluid pressures P in the wheel brakes 11, 12 can be increased to P2.

When the brake pedal operation force F is increased in the range from F2 to F3, the electromagnetic valves 28, 29, 30, 31 are operated (i.e., the normally-open type electromagnetic valves 28, 29 are closed and the normally-closed type electromagnetic valves 30, 31 are opened) and the fluid pump 17 is driven by the operation of the electric motor 16 to supply fluid pressure discharged by the fluid pump 17 to the wheel brake 11 through the check valve 37 and the normally-closed type electromagnetic valve 30, and to supply fluid pressure to the wheel brake 12 through the check valve 38 and the normally-closed type electromagnetic valve 31. In this mode, the fluid pressures P in the wheel brakes 11, 12 can be increased to P3.

In accordance with the operation in which the brake pedal operation force F is increased in the range from F2 to F3, when the fluid pump 17 is operated by an increase in the brake pedal operation force from F2 to F3, the accumulator 19 contains a predetermined quantity of brake fluid. The fluid pump 17 absorbs or draws in fluid pressure from the accumulator 19 and discharges brake fluid under a greater fluid pressure. If the brake fluid in the accumulator 19 is exhausted, the fluid pump 17 can absorb or draw in brake fluid from the reservoir 13 through the check valve 18 and discharge fluid pressure. The fluid pump 17 can rapidly increase the fluid pressure in the wheel brakes 11, 12 since the fluid pump 17 further pressurizes the fluid pressure supplied from the accumulator 19.

It is also possible during the increase in the brake pedal operation force F in the range from F2 to F3 to close the electromagnetic valve 33 after a short period of time so that the pump 17 draws brake fluid from the reservoir 13 through the check valve.

During the process where the brake pedal operation force F is being increased in the range between 0 and F1, when the brake pedal operation force F is maintained at a value which is lower than F1, the electromagnetic valves 30, 31, 32, 33, 34, 35 are not operated and the normally-open type electromagnetic valves 28, 29 are switched into the closed position from the open position to interrupt the flow of fluid pressure from master cylinder 14 to the wheel brakes 11, 12. Thus, the fluid pressure in the wheel brakes 11, 12 is maintained.

During the process where the brake pedal operation force F is being increased between F1 and F2, when the brake pedal operation force F is maintained at a value which is between F1 and F2, the electromagnetic valves 34, 35 are not operated (i.e., they are in the closed position shown in FIG. 1), the normally-opened type electromagnetic valves 28, 29 are in the operational position (i.e., they are in the closed position) and the normally-closed type electromagnetic valves 30, 31 are switched back to the closed position from the open position to interrupt the flow of fluid pressure from the master cylinder 14 and the accumulator 19 into the wheel brakes 11, 12. Thus, the fluid pressure in each of the wheel brakes 11, 12 is maintained.

During the process where the brake pedal operation force F is increased in the range between F2 and F3, when the brake pedal operation force F is maintained at a value which is between F2 and F3, the electromagnetic valves 34, 35 are not operated (i.e., they are in the closed position), the normally-open type electromagnetic valve 28, 29 are in the operated position (i.e., they are in the closed position), and the normally-closed type electromagnetic valves 30, 31 are switched back to the closed position from the opened position to interrupt the flow of fluid pressure from the master cylinder 14, the accumulator 19 and the fluid pump 17 into the wheel brakes 11, 12. In this way, the fluid pressure in the wheel brakes 11, 12 is maintained.

When the brake pedal operation force F is decreased by relief or release operation of the brake pedal 15, the electromagnetic valves 28, 29 are in the operated position (i.e., they are closed), the normally-closed type electromagnetic valves 30, 31 are in the non-operated position (i.e., they are closed), and the normally-closed type electromagnetic valves 34, 35 are switched to move from the closed position to the open position to interrupt the flow of the fluid pressure from the master cylinder 14, the accumulator 19 and the fluid pump 17 into the wheel brakes 11, 12 while at the same time relieving the fluid pressure from the wheel brakes 11, 12 to the reservoir 13. The fluid pressure in the wheel brakes 11, 12 is thus decreased.

A process of storing the fluid pressure in the accumulator 19 will now be described. The normally-closed type electromagnetic valves 30, 31 are not operated, the normally-closed type electromagnetic valve 32 is operated to open the fluid conduit 24 and the normally-open type electromagnetic valve 33 is operated to close the fluid conduit 25. The fluid pump 17 is operated by the driving operation of the electric motor 16 to supply fluid pressure to the accumulator 19 through the fluid conduit 24.

During the process of filling the accumulator 19, the electric motor 16 is continuously operated. The load torque of the electric motor 16 is proportional to the electric current Im driving the electric motor 16. The load torque of the electric motor 16 is determined by detecting the amount of electric current Im flowing into the electric motor 16. The load torque of the electric motor 16, in other words the driving torque of the fluid pump 17, is increased in proportion to the increase of the fluid pressure discharged by the fluid pump 17 (which is equal to the fluid pressure in the accumulator 19). When the accumulator 19 is filled up with brake fluid, the fluid pressure discharged by the fluid pump 17 is suddenly increased to the maximum value P3 which is regulated by the relief valve 36 (i.e., the relief valve 36 relieves any excess fluid pressure above P3) to thereby maximize the load torque of the electric motor 16. When the load torque of the electric motor 16 reaches the maximum value, the driving operation of the electric motor 16 is stopped to intercept or stop the flow of the fluid pressure into the accumulator 19.

The electric current Im flowing into the electric motor 16 is detected in order to detect the load torque of the electric motor 16, because the electric current Im flowing into the electric motor 16 is proportional to the load torque of the electric motor 16.

When the electric current Im exceeds a value Im1 corresponding to a value Tr1 of the load torque which is slightly less than the maximum load torque of the electric motor 16, the electric motor 16 is turned off in order to interrupt the flow of fluid pressure into the accumulator 19.

Further, the electric motor 16 is operated when the brake pedal operation force F exceeds F2 in spite of variations in the fluid pressure in the wheel brakes 11, 12.

The present invention also allows the fluid pressure in the wheel brakes 11, 12 to be varied by the operation of the electromagnetic valves 28–31 and 34, 35 to conduct anti-skid control when the brake pedal 15 is depressed.

Further, the vehicle brake pressure control device can be applied to the brake control functions of brake assist control (compensating for deficiencies in the brake pedal depressing force during emergency braking) and traction control by the operation of the electromagnetic valves 28–31 and 34, 35, the accumulator 19 and the fluid pump 17.

Under the anti-skid control or the traction control, the normally-open type electromagnetic valves 28, 29 are operated to disconnect the wheel brakes 11, 12 from the master cylinder 14, the electric motor 16 is operated to drive the fluid pump 17, and the electromagnetic valves 30, 31, 34, 35 are operated repeatedly.

The quantity of brake fluid necessary to increase the fluid pressure in the wheel brakes 11, 12 to P3 is only slightly larger, relatively speaking, than the quantity of brake fluid which is supplied from the master cylinder 14 to the wheel brakes 11, 12 to increase the fluid pressure in the wheel brakes to P1. Therefore, in this embodiment of the present invention, the fluid pump 17 and the accumulator 19 can be reduced in size relative to the size of the fluid pump and the accumulator in conventional vehicle brake pressure control devices.

The operations of the electromagnetic valves 28, 29, 30, 31, 32, 33, 34, 35 and the electric motor 16 are controlled by an electronic control unit 39. The electronic control unit 39 also receives input signals from several different sensors. These sensors include a foot force sensor S1 installed on the brake pedal 15 for detecting the brake pedal operation force, a vehicle deceleration sensor S2, an electric current sensor S3 which detects the electric current flowing into the electric motor 16, a stroke sensor S4 which detects the operational stroke of the brake pedal 15, a fluid pressure sensor S5 which detects the fluid pressure in the front-right wheel brake 11, a fluid pressure sensor S6 which detects the fluid pressure in the rear-left wheel brake 12, a front-right wheel speed sensor S7 disposed near the front-right wheel Wfr and a rear-left wheel speed sensor S8 disposed near the rear-left wheel Wrl.

It is to be understood that a fluid pressure sensor detecting the fluid pressure in the master cylinder 14 may be used as a brake pedal operation force sensor instead of the foot force sensor S1 shown in FIG. 1 because the fluid pressure in the master cylinder 14 is proportional to the brake pedal operation force applied to the brake pedal 15.

Additionally, as an alternative to the deceleration detected by the vehicle deceleration sensor S2, an estimated vehicle deceleration can be determined or estimated from the wheel speeds detected by the wheel speed sensors S7, S8.

Figure 2:
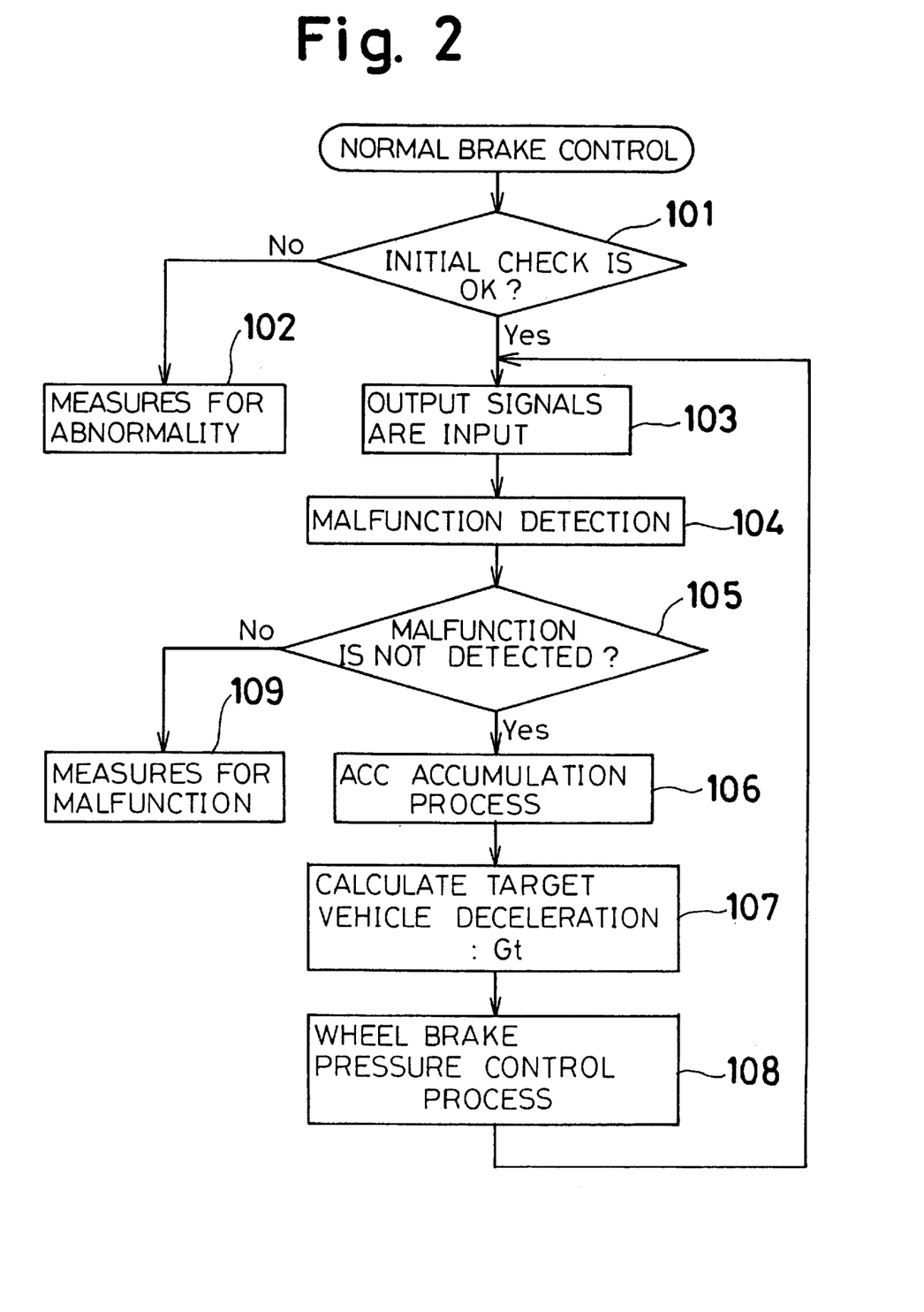
FIG. 2 is a flow chart illustrating the overall brake control operation associated with the control unit shown in FIG. 1.

A flow chart illustrating the normal brake control of the electric control unit 39 is shown in FIG. 2. At step 101 the electromagnetic valves 28, 29, 30, 31, 32, 33, 34, 35, the electric motor 16 and the sensors S1, S2, S3, S4, S5, S6, S7, S8 are initially checked. When an abnormality of at least one of the electromagnetic valves 28–35, the electric motor 16 and the sensors S1–S8 is detected at step 101, the program proceeds to step 102 to take counter-measures, for example turning on an idiot light in the vehicle to alert the driver to the abnormality or malfunction. Otherwise, the program proceeds to step 103 so that the output signals from the sensors S1–S8 are input into the electronic control unit 39. At step 104, a malfunction detection function is performed so that if a malfunction of the vehicle brake pressure control device for a vehicle occurs, it is detected based on the output signals from the sensors S1 to S8. At step 105, when a malfunction of the brake pressure control device is not detected, the program proceeds to step 106 to store fluid pressure in the accumulator 19. This ACC accumulation process is discussed in more detail below. After that, at step 107 a target vehicle deceleration Gt is calculated based on the output signal from the foot force sensor S1. Further, after the wheel brake pressure control process, which is discussed in more detail below, is conducted at step 108, the program returns to step 103.

At step 105, when a malfunction of the brake pressure control device for a vehicle is detected, the program proceeds to step 109 to take counter-measures, for example turning on the idiot light in the vehicle, or prohibiting further operations of the electromagnetic valves 28–35.

Figure 3:
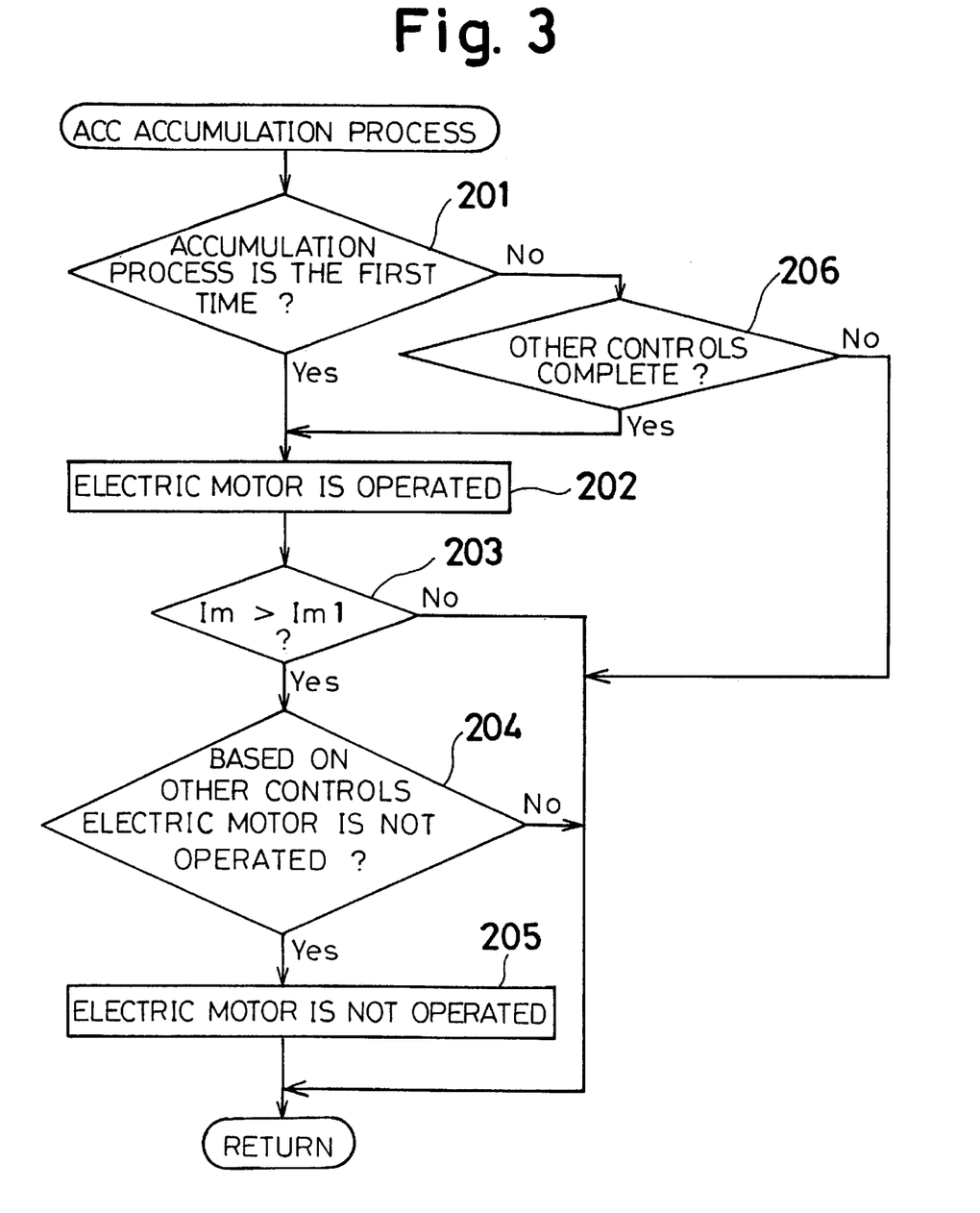
FIG. 3 is a flow chart illustrating the ACC accumulation process forming a part of the overall operation shown in FIG. 2.

The ACC accumulation process referenced as step 106 in the flowchart of FIG. 2 is shown in detail in FIG. 3. At step 201, the electronic control unit 39 determines whether or not the ACC accumulation process is being performed for the first time. When the ACC accumulation process is being carried out for the first time, the program proceeds to step 202 to cause the electric motor 16 to be operated. At step 203, the electronic control unit 39 determines whether or not the electric current Im flowing into the electric motor 16 is more than the value Im1. When the electric current Im flowing into the electric motor 16 is not greater than Im1, thus indicating that the accumulator 19 is not filled up with brake fluid, the program returns to step 107 in FIG. 2. When the electric current Im flowing into the electric motor 16 is greater than Im1, thus indicating that the accumulator 19 is filled up with brake fluid, the program proceeds to step 204 to determine whether or not, based on the normal brake control function or any other brake control functions (for example, the normal brake control, anti-skid control, traction control), the electronic control unit 39 is presently causing the electric motor 16 not to be operated. When it is determined that the electric motor 16 should not be operated based upon any of the brake controls, the program returns to step 107 in FIG. 2 after the electric motor 16 is turned off at step 205. When it is determined that the electric motor 16 is to be operated based on any of the brake controls, the program returns to step 107 in FIG. 2.

When it is determined at step 201 that the ACC accumulation process is not being performed for the first time, the program proceeds to step 206 to detect whether all of the brake control functions have been completed. When the electronic control unit 39 detects that all other brake controls have been completed, the program carries out steps 202 to 205. Otherwise (i.e., if no other brake control function has been carried out, or if some brake control function is proceeding), the program returns to step 107 in FIG. 2.

The first storage of the fluid pressure into the accumulator 19 is carried out when an ignition switch of the vehicle is turned on so that the ignition circuit is closed. After that, the storage of the fluid pressure into the accumulator 19 is carried out when normal brake control functions or some other control functions have been completed.

Figure 4:
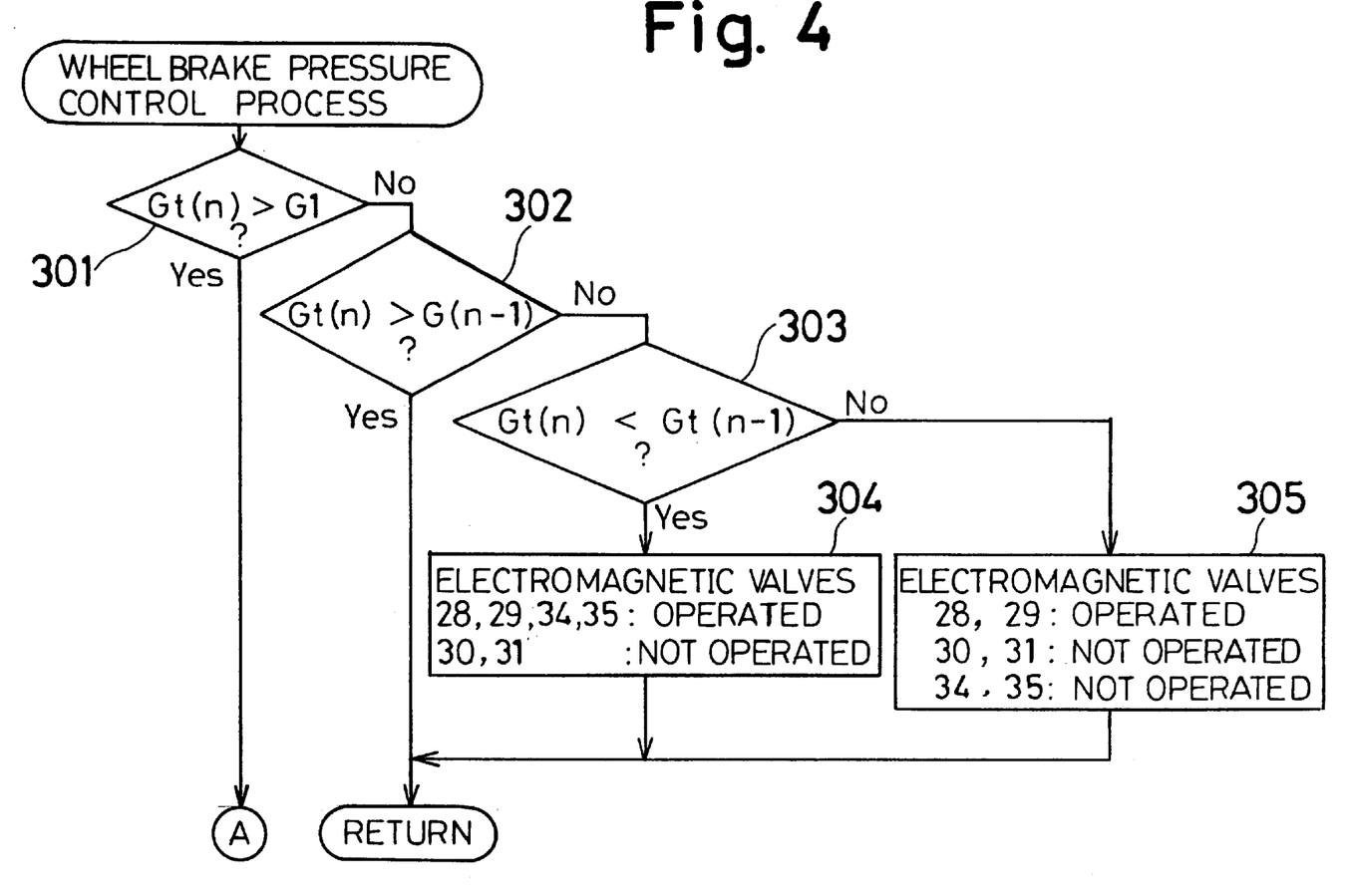
FIG. 4 is a flow chart illustrating a portion of the wheel brake pressure control process forming a part of the overall brake control operation shown in FIG. 2.
Figure 5:
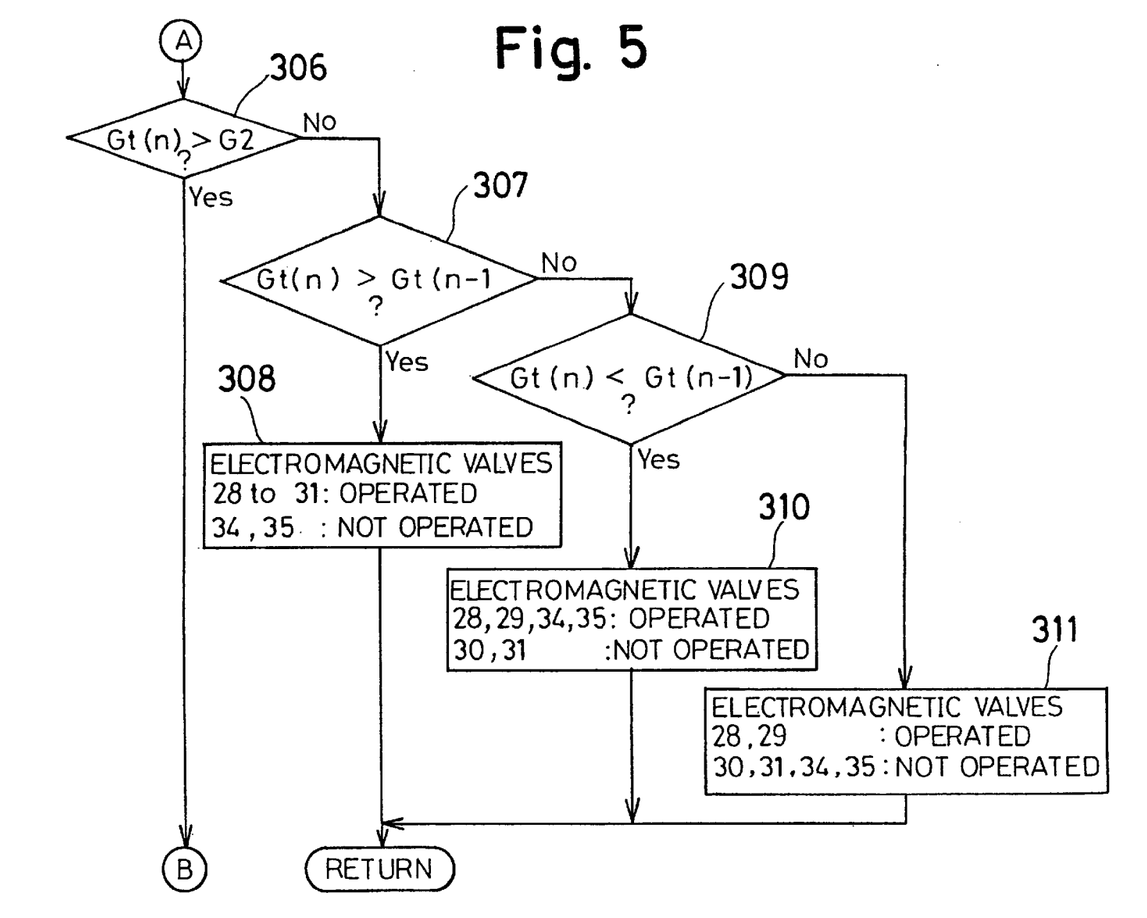
FIG. 5 is a flow chart illustrating another portion of the wheel brake pressure control process forming a part of the overall brake control operation shown in FIG. 2.
Figure 6:
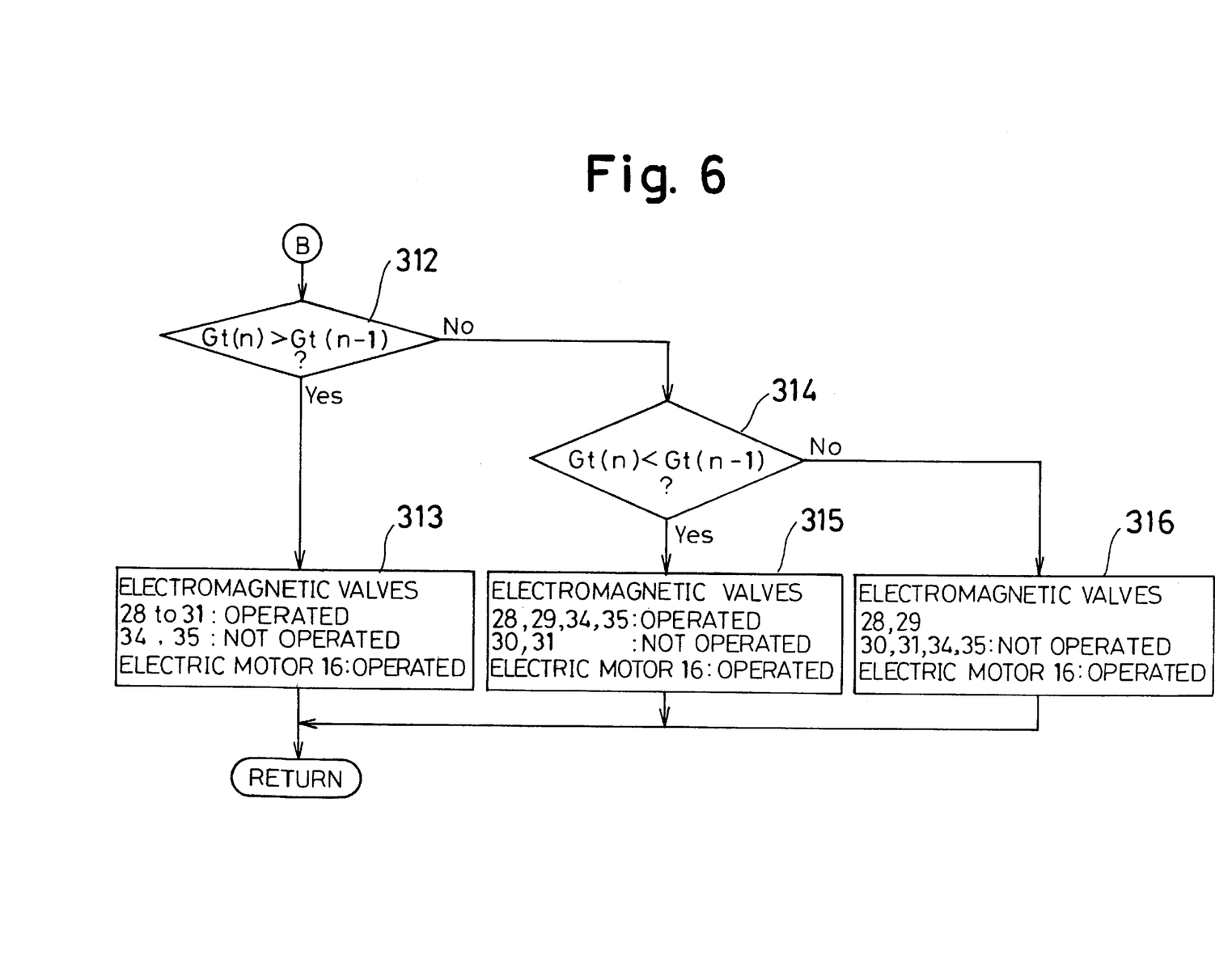
FIG. 6 is a flow chart illustrating a further portion of the wheel brake pressure control process forming a part of the overall brake control operation shown in FIG. 2.

The wheel brake pressure control process at step 108 in FIG. 2 is shown in FIGS. 4 to 6. At step 301, the electronic control unit 39 determines whether or not the target vehicle deceleration Gt(n) which is calculated at the present time is more than the predetermined value G1. When the target vehicle deceleration Gt(n) is not greater than G1, the program proceeds to step 302 at which the electronic control unit 39 determines whether the target vehicle deceleration Gt(n) is greater than the target vehicle deceleration Gt(n−1) representing the last or immediately preceding target vehicle deceleration value that was calculated. When the target vehicle deceleration Gt(n) is more than Gt(n−1) (in other words, when the driver is demanding an increase in deceleration), the program returns to step 103 in FIG. 2. The fluid pressure in the wheel brakes 11, 12 is thus increased because of the supply of fluid pressure to the wheel brakes 11, 12 from the master cylinder 14.

When the target vehicle deceleration Gt(n) is not greater than Gt(n−1), the program proceeds to step 303 to determine whether Gt(n) is less than Gt(n−1) or not. When Gt(n) is less than Gt(n−1) (in other words, when the vehicle driver is demanding a decrease in deceleration), the program proceeds to step 304. At step 304, after the electronic control unit 39 causes the electromagnetic valves 28, 29, 34, 35 to be operated while not causing the electromagnetic valves 30, 31 to be operated, the program returns to step 103 in FIG. 2. Therefore, the fluid pressure in the wheel brakes 11, 12 is reduced by virtue of fluid flowing into the reservoir 13, thereby decreasing the fluid pressure in the wheel brakes 11, 12. When Gt(n) is equal to Gt(n−1), the program proceeds to step 305. At step 305, after the electronic control unit 39 causes the electromagnetic valves 28, 29 to be operated while the electromagnetic valves 30, 31, 34, 35 are not caused to be operated, the program returns to step 103 in FIG. 2. Therefore, the fluid pressure in the wheel brakes 11, 12 is maintained.

When it is determined at step 301 in FIG. 4 that the target vehicle deceleration Gt(n) is more than G1, the program proceeds to step 306 in FIG. 5, where the electric control unit 29 determines whether or not the target vehicle deceleration Gt(n) is more than the predetermined value G2. When the target vehicle deceleration Gt(n) is not greater than G2, the program proceeds to step 307 at which the electronic control unit 39 determines whether or not the target vehicle deceleration Gt(n) is more than the target vehicle deceleration Gt(n−1). When the target vehicle deceleration Gt(n) is more than Gt(n−1), the program returns to step 103 in FIG. 2 after the electronic control unit 39 causes the electromagnetic valves 28–31 to be operated while the electromagnetic valves 34, 35 are not caused to be operated at step 308. Therefore, the fluid pressure in the accumulator 19 is supplied to the wheel brakes 11, 12 so as to increase the fluid pressure in the wheel brakes 11, 12.

When the target vehicle deceleration Gt(n) is not greater than Gt(n−1), the program proceeds to step 309 to determine whether or not Gt(n) is less than Gt(n−1). When Gt(n) is less than Gt(n−1), the program proceeds to step 310. At step 310, after the electronic control unit 39 causes the electromagnetic valves 28, 29, 34, 35 to be operated while the electromagnetic valves 30, 31 are not caused to be operated, the program returns to step 103 in FIG. 2. Therefore, the fluid pressure in the wheel brakes 11, 12 is reduced because the fluid flows into the reservoir 13, thereby decreasing the fluid pressure in the wheel brakes 11, 12. When Gt(n) is equal to Gt(n−1), the program proceeds to step 311. At step 311, after the electronic control unit 39 causes the electromagnetic valves 28, 29 to be operated while the electromagnetic valves 30, 31, 34, 35 are not caused to be operated, the program returns to step 103 in FIG. 2. Therefore, the fluid pressure in the wheel brakes 11, 12 is maintained.

When the target vehicle deceleration Gt(n) is more than G2 at step 306 in FIG. 5, the program proceeds to step 312 in FIG. 6 at which the electric control unit 39 determines whether or not the target vehicle deceleration Gt(n) is more than the target vehicle deceleration Gt(n−1). When the target vehicle deceleration Gt(n) is more than Gt(n−1), the program returns to step 103 in FIG. 2 after execution of step 313 in FIG. 6 at which the electric control unit 39 causes the electromagnetic valves 28–31 to be operated, causes the electromagnetic valves 34, 35 not to be operated, and operates the electric motor 16. Therefore, the fluid pressure generated by the fluid pump 17 is supplied to the wheel brakes 11, 12 to increase the fluid pressure in the wheel brakes 11, 12.

When the target vehicle deceleration Gt(n) is not greater than Gt(n−1), the program proceeds to step 314 to determine whether or not the target vehicle deceleration Gt(n) is less than Gt(n−1). When the target vehicle deceleration Gt(n) is less than Gt(n−1), the program proceeds to step 315. At step 315, after the electronic control unit 39 causes the electromagnetic valves 28, 29, 34, 35 to be operated while the electromagnetic valves 30, 31 are not caused to be operated, and operates the electric motor 16, the program returns to step 103 in FIG. 2. Therefore, the fluid pressure in the wheel brakes 11, 12 is relieved or reduced by virtue of the fluid flowing into the reservoir 13 to thereby decrease the fluid pressure in the wheel brakes 11, 12. When the target vehicle deceleration Gt(n) is equal to Gt(n−1), the program proceeds to step 316. At step 316, after the electronic control unit 39 causes the electromagnetic valves 28, 29 to be operated while the electromagnetic valves 30, 31, 34, 35 are not operated, the program returns to step 103 in FIG. 2. Therefore, the fluid pressure in the wheel brakes 11, 12 is maintained.

Figure 7:
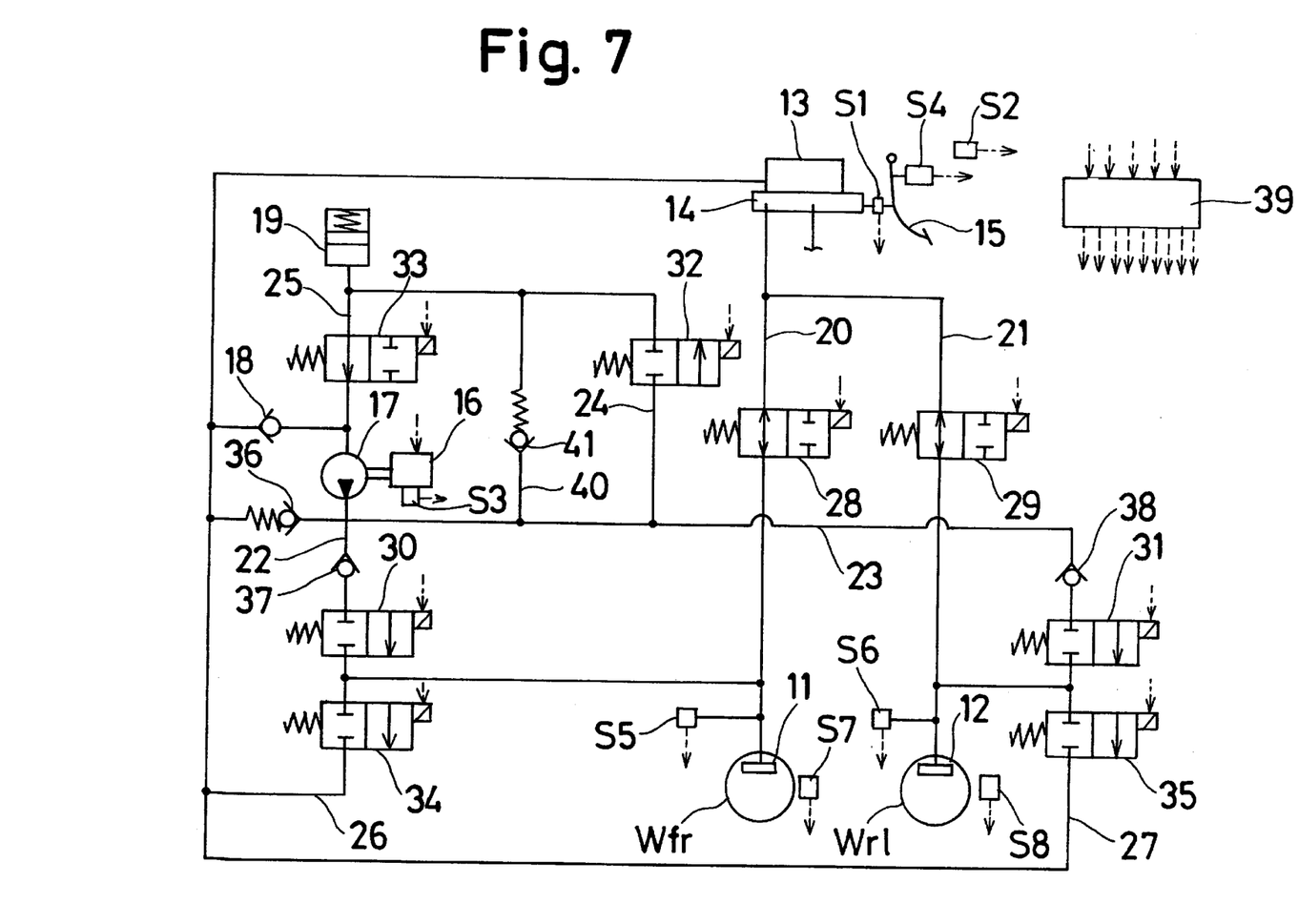
FIG. 7 is a schematic illustration of the brake pressure control device for a vehicle according to a second embodiment of the present invention of the invention.

FIG. 7 schematically illustrates the system forming one of brake circuits of the vehicle brake pressure control device according to a second embodiment of the present invention. this embodiment is used primarily for front-wheel-drive vehicles and entails what is referred to as a diagonal piping system. Other than as described below, the features associated with the second embodiment are the same as in the first embodiment.

The vehicle brake pressure control device shown in FIG. 7 includes a fluid conduit 40 connecting the discharge port of the fluid pump 17 to the accumulator 19. A check valve 41 is disposed on the fluid conduit 41 which is opened at a predetermined value of the fluid pressure which is slightly lower than the difference between the maximum value of the fluid pressure stored in the accumulator 19 and the maximum value P3 of the fluid pressure discharged by the fluid pump 17. The other brake circuit forming the remainder of the system depicted in FIG. 7 is provided with the same components as the brake circuit described above and shown in FIG. 7.

In accordance with the above vehicle brake pressure control device, the fluid pressure discharged by the fluid pump 17 is supplied to the accumulator 19 through the check valve 41 when the brake pedal operation force F is more than F2, the electric motor 16 is operated and the electromagnetic valves 30, 31 are not operated so as to decrease or maintain the fluid pressure in the wheel brakes. 11, 12.

Figure 8:
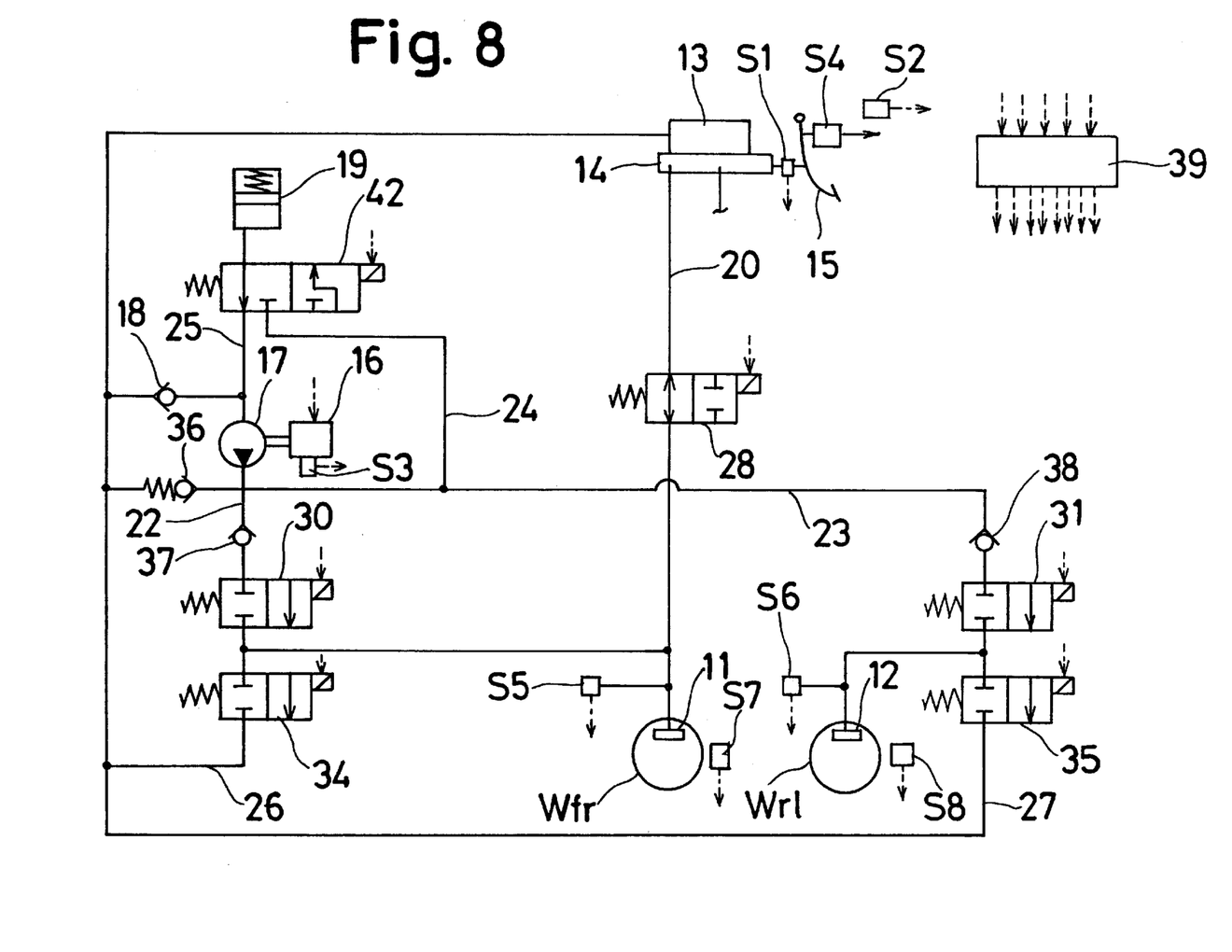
FIG. 8 is a schematic illustration of the brake pressure control device for a vehicle according to a third embodiment of the present invention.

FIG. 8 schematically illustrates the system forming one of brake circuits of the vehicle brake pressure control device according to a third embodiment of the present invention. This embodiment is used mainly for front-wheel-drive vehicles entailing what is referred to as a diagonal piping system. This vehicle brake pressure control device in FIG. 8 is formed by substituting a 3-port, 2-position electromagnetic valve 42 for the electromagnetic valves 32, 33, and omitting the fluid conduit 21 and the electromagnetic valve 29 of the vehicle brake pressure control device shown in FIG. 1. Thus, the electromagnetic valve 42 functions as two valves.

With the electromagnetic valve 42 in the non-operational position shown in FIG. 8, the fluid conduit 24 is closed while the fluid conduit 25 is open. The electromagnetic valve 42 is operated to open the fluid conduit 24 and close the fluid conduit 25 when the fluid pressure discharged by the fluid pump 17 is to be stored in the accumulator 19. The other brake circuit forming the other part of the vehicle brake control device of the embodiment shown in FIG. 8 is the same as that shown in FIG. 8 and includes the same components.

In accordance with the vehicle brake pressure control device shown in FIG. 8, even though, for example, the fluid pressure is not applied to the rear-left wheel brake Wrl because of a malfunction of the medium fluid pressure source or the high fluid pressure source, the vehicle can obtain the necessary deceleration because the fluid pressure applied to the front-right wheel brake 11 can generate a large amount of brake force relative to the rear-left wheel brake 12, from the master cylinder 14.

When the brake pressure control device for a vehicle of the present invention is applied to "front and rear wheel piping" used in rear-wheel drive vehicles, one of the brake circuits including the front-right wheel brake and the front-left wheel brake may be formed as shown in FIG. 1 and the rear-right wheel brake and the rear-left wheel brake may receive the fluid pressure only from the fluid pump and the accumulator.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A brake pressure control device for a vehicle that includes a brake pedal comprising:

a first wheel brake for applying a brake force to a first wheel;

a reservoir for storing brake fluid under atmospheric pressure;

a master cylinder receiving brake fluid from the reservoir for generating fluid pressure in proportion to a brake pedal operation force;

an accumulator for storing fluid pressure which is higher than the fluid pressure generated by the master cylinder;

a fluid pump for discharging fluid pressure which is higher than the fluid pressure in the accumulator;

a first fluid conduit connecting the master cylinder to the first wheel brake;

a second fluid conduit connecting the fluid pump to the first wheel brake;

a third fluid conduit connecting a discharge port of the fluid pump to the accumulator;

a fourth fluid conduit connecting the accumulator to a suction port of the fluid pump;

a fifth fluid conduit for connecting the first wheel brake to the reservoir;

a first valve for opening and closing the first fluid conduit;

a second valve for opening and closing the second fluid conduit;

a third valve in the form of an electromagnetic valve for opening and closing the third fluid conduit;

a fourth valve for opening and closing the fourth fluid conduit;

a fifth valve for opening and closing the fifth fluid conduit;

a relief valve regulating a maximum value of the fluid pressure discharged from the fluid pump;

a brake pedal operation force detecting means for detecting an operation force of the brake pedal;

a deceleration detecting means for detecting vehicle deceleration; and a controller for estimating a target deceleration of the vehicle based on the brake pedal operation force detected by the brake pedal operation force detecting means, for controlling the first valve, the second valve, the fourth valve, the fifth valve and the fluid pump to supply fluid pressure to the wheel brake so that the vehicle deceleration detected by the deceleration detecting means agrees with the target deceleration of the vehicle estimated by the controller, and for controlling at least the third valve and the fluid pump to supply fluid pressure to the accumulator.

2. A brake pressure control device for a vehicle as recited in claim 1, wherein each of the first valve, the second valve, the third valve, the fourth valve and the fifth valve is a 2-port 2-position electromagnetic valve.

3. A brake pressure control device for a vehicle as recited in claim 1, wherein each of the first valve, the second valve and the fifth valve is a 2-port 2-position electromagnetic valve, and the third valve and the fourth valve are formed as a 3-port 2-position electromagnetic valve.

4. A brake pressure control device for a vehicle as recited in claim 1, further comprising a second wheel brake for applying a brake force to a second wheel of the vehicle, a sixth fluid conduit connecting the master cylinder to the second wheel brake, a seventh fluid conduit connecting the fluid pump to the second wheel brake, an eighth fluid conduit connecting the second wheel brake to the reservoir, a sixth valve for opening and closing the sixth fluid conduit, a seventh valve for opening and closing the seventh fluid conduit, a eighth valve for opening and closing for opening and closing the eighth fluid conduit, a first check valve which prevents fluid pressure in the first wheel brake from flowing into the second wheel brake through the second fluid conduit and the seventh fluid conduit, a second check valve which prevents the fluid pressure in the second wheel brake from flowing into the first wheel brake through the seventh fluid conduit and the second fluid conduit, the controller controlling the sixth valve, the seventh valve and the eighth valve.

5. A brake pressure control device for a vehicle as recited in claim 1, wherein the first wheel is a front wheel of the vehicle, and including a second wheel brake for applying a brake force to a second wheel which is a rear wheel of the vehicle, a sixth fluid conduit connecting the fluid pump to the second wheel brake, a seventh fluid conduit connecting the second wheel brake to the reservoir, a sixth valve for opening and closing the sixth fluid conduit, a seventh valve for opening and closing the seventh fluid conduit, a first check valve which prevents fluid pressure in the first wheel brake from flowing into the second wheel brake through the second fluid conduit and the sixth fluid conduit, a second check valve which prevents fluid pressure in the second wheel brake from flowing into the first wheel brake through the sixth fluid conduit and the second fluid conduit, the controller controlling the sixth valve and the seventh valve.

6. A brake pressure control device for a vehicle as recited in claim 2, including a sixth fluid conduit connecting the fluid pump to the accumulator and a check valve disposed on the sixth fluid conduit, the check valve being opened with a predetermined fluid pressure which is lower than a difference between a maximum fluid pressure in the accumulator and a maximum fluid pressure discharged by the fluid pump.

7. A brake pressure control device for a vehicle comprising:

a wheel brake for applying a brake force to a vehicle wheel;

a master cylinder connected to the wheel brake and adapted to generate fluid pressure proportional to a brake pedal operation force;

an accumulator adapted to store fluid pressure which is higher than the fluid pressure generated by the master cylinder;

a fluid pump connected to the wheel brake and adapted to discharge fluid pressure to the wheel brake which is higher than the fluid pressure in the accumulator, the fluid pump having a suction port connected to the accumulator;

a first valve in the form of a 2-port, 2-position electromagnetic valve disposed between the master cylinder and the wheel brake for controlling fluid pressure supplied from the master cylinder to the wheel cylinder;

a second valve in the form of a 2-port, 2-position electromagnetic valve disposed between the fluid pump and the wheel brake for controlling fluid pressure supplied from the fluid pump to the wheel cylinder;

a third valve in the form of a 2-port, 2-position electromagnetic valve disposed between the accumulator and the pump for controlling fluid pressure supplied by the accumulator to the wheel brake;

a brake pedal operation force detecting means for detecting a brake pedal operation force;

a deceleration detecting means for detecting vehicle deceleration; and a controller which estimates a target deceleration of the vehicle based on the brake pedal operation force detected by the brake pedal operation force detecting means and controls the first, second and third valves to supply fluid pressure to the wheel brake so that the vehicle deceleration detected by the deceleration detecting means coincides with the target deceleration of the vehicle estimated by the controller.

8. A brake pressure control device for a vehicle as recited in claim 7, including a reservoir to which the master cylinder is connected, the wheel brake being connected to the reservoir, a fourth valve located between the wheel brake and the reservoir for controlling fluid pressure flow from the wheel brake to the reservoir.

9. A brake pressure control device for a vehicle as recited in claim 8, wherein the pump includes an inlet end that is connected to the reservoir for drawing in fluid from the reservoir.

10. A brake pressure control device for a vehicle as recited in claim 7, wherein the fluid pump includes a discharge port that is connected to the accumulator, and including a valve disposed between the fluid pump and the accumulator for controlling fluid pressure from the fluid pump to the accumulator to permit the fluid pump to pump brake fluid into the accumulator.

11. A brake pressure control device for a vehicle as recited in claim 10, wherein the valve disposed between the fluid pump and the accumulator is a 2-port, 2-position electromagnetic valve.

12. A brake pressure control device for a vehicle as recited in claim 10, wherein the valve disposed between the fluid pump and the accumulator is a 3-port, 2-position electromagnetic valve.

13. A brake pressure control device for a vehicle as recited in claim 7, wherein the controller controls the first, second and third valves to: 1) supply fluid pressure from the master cylinder to the wheel brake when the target deceleration of the vehicle determined by the controller is less than a first predetermined value; 2) supply fluid pressure from the accumulator to the wheel brake when the target deceleration of the vehicle determined by the controller is greater than the first predetermined value and less than a second predetermined value; and 3) supply fluid pressure from the fluid pump to the wheel brake when the target deceleration of the vehicle determined by the controller is greater than the second predetermined value.

14. A brake pressure control device for a vehicle comprising:

a wheel brake for applying a brake force to a vehicle wheel;

a master cylinder connected to the wheel brake and adapted to generate fluid pressure proportional to a brake pedal operation force;

an accumulator adapted to store fluid pressure which is higher than the fluid pressure generated by the master cylinder;

a fluid pump connected to the wheel brake and adapted to discharge fluid pressure to the wheel brake which is higher than the fluid pressure in the accumulator, said fluid pump having a suction port and a discharge port, said accumulator being connected to the suction port of the fluid pump;

a vehicle deceleration detector;

means for estimating a target deceleration of the vehicle; and means for controlling fluid pressure supplied to the wheel cylinder to produce coincidence between a vehicle deceleration detected by the vehicle deceleration detector and the target deceleration of the vehicle by: 1) supplying fluid pressure to the wheel brake from the master cylinder when the target deceleration of the vehicle determined by the controller is less than a first predetermined value; 2) supplying fluid pressure to the wheel brake from the accumulator when the target deceleration of the vehicle determined by the controller is greater than the first predetermined value and less than a second predetermined value; and 3) supplying fluid pressure to the wheel brake from the fluid pump when the target deceleration of the vehicle determined by the controller is greater than the second predetermined value.

15. A brake pressure control device for a vehicle as recited in claim 14, wherein said means for controlling includes a controller which controls a first valve disposed between the master cylinder and the wheel brake for controlling fluid pressure supplied from the master cylinder to the wheel cylinder, a second valve disposed between the fluid pump and the wheel brake for controlling fluid pressure supplied from the fluid pump to the wheel cylinder, and a third valve disposed between the accumulator and the fluid pump for controlling fluid pressure supplied from the accumulator to the suction port of fluid pump.

16. A brake pressure control device for a vehicle as recited in claim 14, including a reservoir to which the master cylinder is connected, the wheel brake being connected to the reservoir, and a valve located between the wheel brake and the reservoir for controlling fluid pressure flow from the wheel brake to the reservoir.

17. A brake pressure control device for a vehicle as recited in claim 14, wherein the suction port of the fluid pump is connected to the reservoir for drawing in fluid from the reservoir, and including a one-way valve disposed between the suction port of the fluid pump and the reservoir for permitting flow from the reservoir to the fluid pump while preventing flow from the fluid pump to the reservoir.

18. A brake pressure control device for a vehicle as recited in claim 14, wherein the discharge port of the fluid pump is connected to the accumulator, and including a valve disposed between the discharge port of the fluid pump and the accumulator for controlling fluid pressure flow from the fluid pump to the accumulator.

* * * * *